C. MÖLLER.
DISTANCE INSTRUMENT.
APPLICATION FILED SEPT. 13, 1910.

1,000,282.

Patented Aug. 8, 1911.
3 SHEETS—SHEET 1.

Witnesses:

Inventor,
Carl Möller

C. MÖLLER.
DISTANCE INSTRUMENT.
APPLICATION FILED SEPT. 13, 1910.

1,000,282.

Patented Aug. 8, 1911.

3 SHEETS—SHEET 3.

Witnesses:

Inventor:

UNITED STATES PATENT OFFICE.

CARL MÖLLER, OF IHRINGSHAUSEN, NEAR CASSEL, GERMANY.

DISTANCE INSTRUMENT.

1,000,282.   Specification of Letters Patent.   Patented Aug. 8, 1911.

Application filed September 13, 1910. Serial No. 581,792.

*To all whom it may concern:*

Be it known that I, CARL MÖLLER, a citizen of the Empire of Germany, residing at Ihringshausen, near Cassel, in the Empire of Germany, have invented a new and useful Distance Instrument, of which the following is a specification.

The known distance instruments employed in shore-batteries for ascertaining the distance of any man-of-war or other vessel present the defect that owing to the comparatively low height at which the instrument is disposed the correction of the height depending upon the range of the tide, is not exactly the same for all distances, so that the variation of the distance of an object renders a constant readjustment of the instrument necessary in order to get exact measurements.

My invention consists of a distance instrument which avoids this defect.

The chief feature is a preferably conical drum covered with a series of curves indicating the distances, which drum is revoluble around the vertical axis of the apparatus. By turning the drum the telescope is moved in a vertical plane, and the distance can be read off on the drum by an indicator, which can be vertically adjusted on a rule provided with a scale corresponding to the range of the tide. The base of the apparatus is a disk, having at its periphery worm teeth, in which a worm can engage in order to turn the telescope around the vertical axis. The said disk is provided above the worm teeth with a scale having the division of a circle. A mark at the indicating disk serves as an indicator for this scale. The tubular nave of the indicating disk carries a crosshead at one end of which the front end of the telescope is mounted to rock about a horizontal axis, while the rear end of the telescope containing the ocular can be raised and lowered by means of a vertical screw engaging in the other end of the crosshead. At the upper edge of the drum an internally toothed ring is detachably mounted and can be horizontally adjusted. A pinion fastened at the lower end of the screw meshes with the teeth of the toothed ring and a knurled knob at the upper end of the screw serves for turning the screw, so that the floating-line of the respective man-of-war or other vessel can be brought into the horizontal line of the "cross hairs".

I will now proceed to describe my invention with reference to the accompanying drawings, in which—

Figure 1:
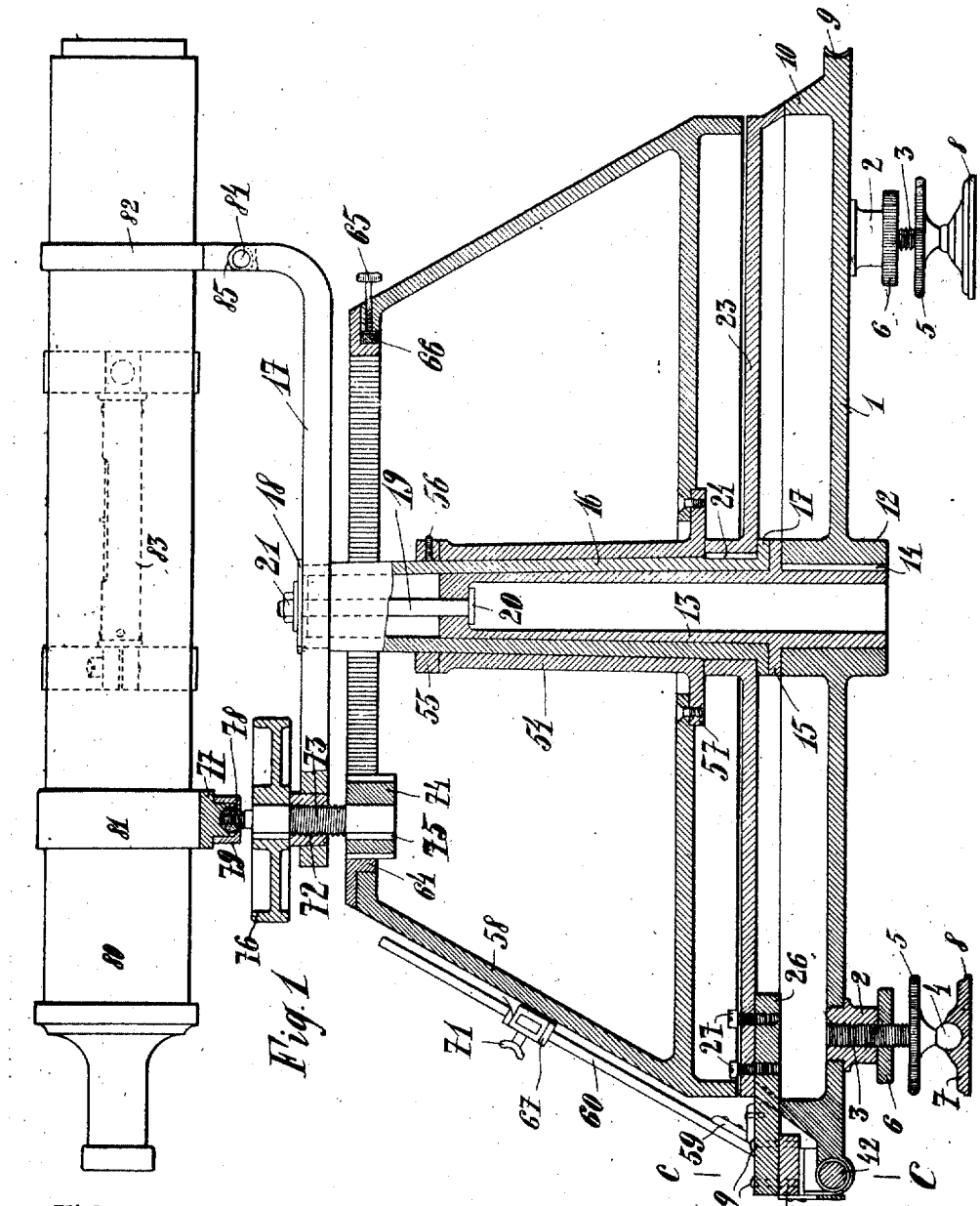
Figure 2:
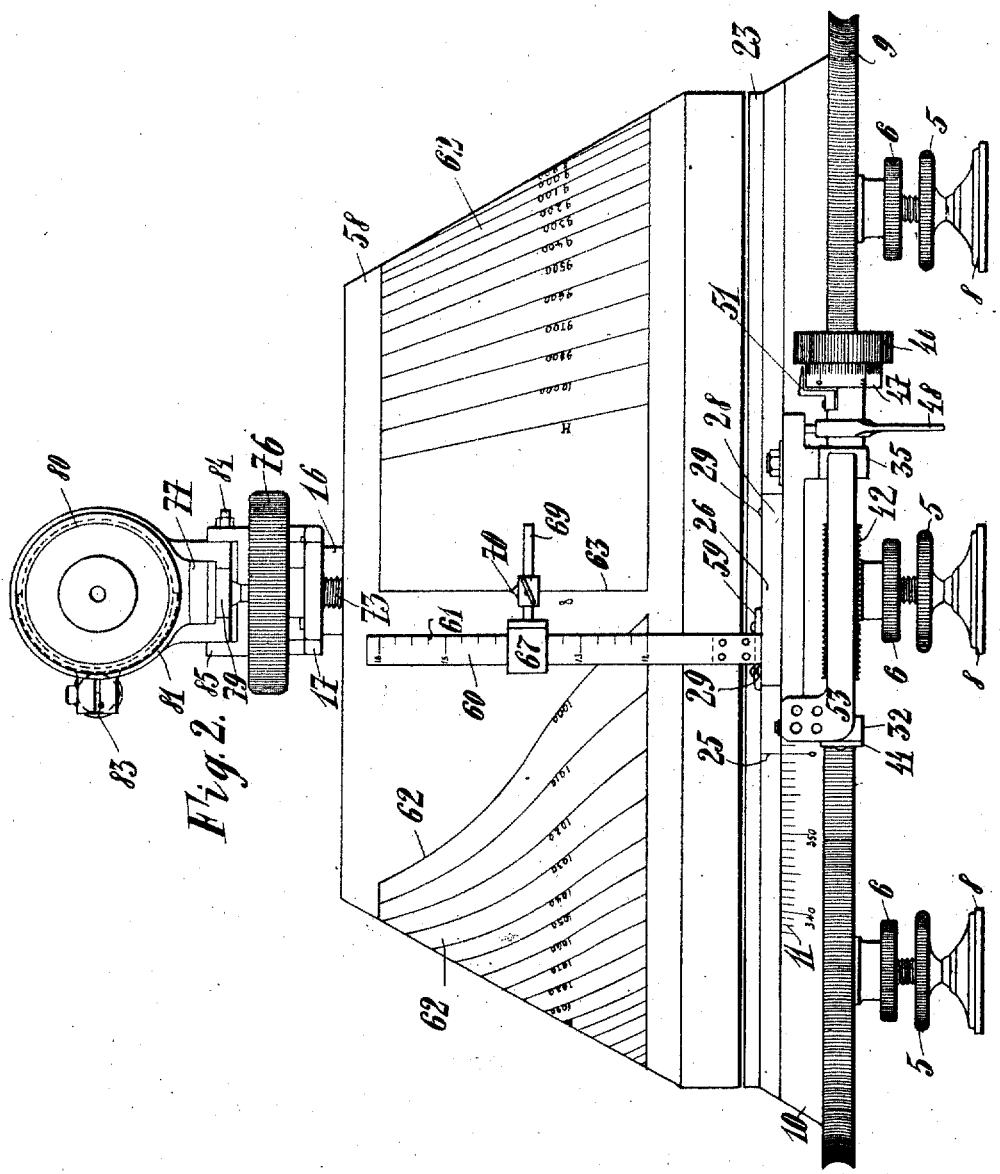
Figure 3:
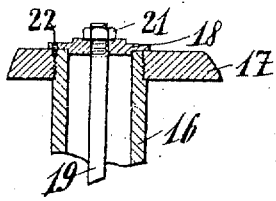
Figure 4:
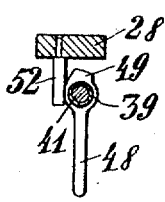
Figure 5:
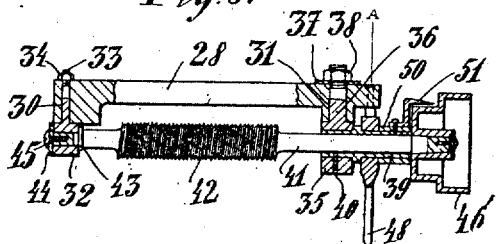
Figure 7:
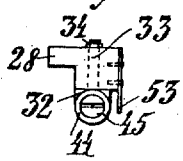
Figure 6:
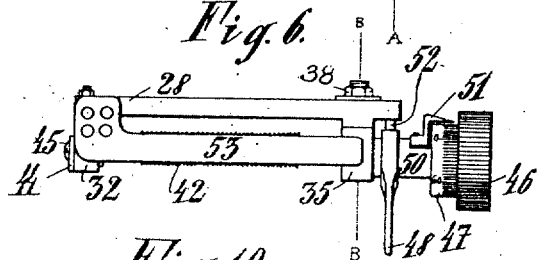
Figure 8:
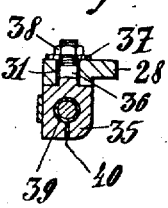
Figure 9:
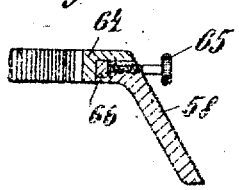
Figures 10, 11:
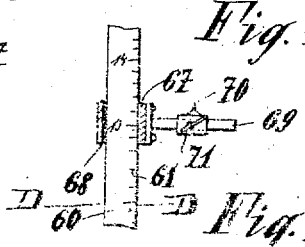
Figure 13:
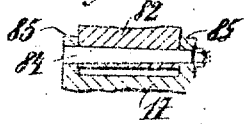
Figure 12:
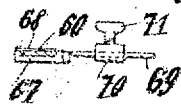

Figure 1 is a vertical longitudinal section through the new distance instrument and shows the telescope and a part of the tubular support in elevation, Fig. 2 is an end view of the same, when looked at from the left in Fig. 1, Fig. 3 illustrates the connection of the tubular support with the crosshead, Fig. 4 is a vertical section through the line A—A in Fig. 5, when looked at from left, Fig. 5 is a vertical section through the line C—C in Fig. 1 and shows the worm and the parts for moving it into and out of engagement with the worm teeth of the base disk, Fig. 6 is an elevation of the parts shown at Fig. 5, Fig. 7 is an end view of the same when looked at from the left, Fig. 8 is a vertical section through the line B—B in Fig. 6, when looked at from right, Fig. 9 illustrates the manner in which the toothed ring at the upper edge of the drum can be released and secured, Fig. 10 illustrates the connection between the support for the telescope and the raising and lowering screw, Fig. 11 shows a part of the rule and the slide with the indicator, Fig. 12 is a section through the line D—D in Fig. 11, and Fig. 13 illustrates the connection of the telescope with the crosshead.

Similar characters of reference refer to similar parts throughout the several views.

1 denotes a base disk which is placed on some table or other support by means of three adjusting feet of the following construction. A boss 2 is screwed into the base disk 1 and has a threaded hole, in which a screw 3 engages. The screw 3 may be made in one with a globular pivot 4 and a knurled knob 5 and can be secured by a counter-nut 6. The pivot 4 engages in a socket 7 which is bent over it by rolling or otherwise and is made in one with a disk 8, that is placed on the table or the like. The base disk 1 is at is periphery provided with worm teeth 9 and above them with a rim 10 which on its conical outer surface is provided with a division of a circle serving as a scale 11 (Fig. 2). In the nave 12 of the base disk 1 is secured a hollow pillar 13 by means of a key 14 or the like. Preferably the pillar 13 is provided with a collar 15 which bears on the nave 12. A tubular support 16 is mounted on the pillar 13 to turn, which bears with its lower flange 17 against the collar 15 of the pillar and is at its upper end set off and provided with a screw-thread as is clearly shown at Fig. 3. A crosshead 17 engages in this screw-thread and is secured by means of a disk 18 and a bolt 19, which latter passes through a central hole at the top of the pillar 13 and bears with its head 20 from below against the underside of the said top. The bolt 19 engages by means of a screw-thread in the disk 18 and is therein secured by a counter-nut 21. A small screw 22 engaging in the disk 18 and the screw-thread of the pillar 16 and the crosshead 17 prevents the disk 18 from getting loose. In this manner the tubular support 16 is prevented from endwise motion, while it is permitted to turn on the pillar 13. An indicating disk 23 is secured at the lower end of the support 16 by means of a key 24 or the like. The periphery of the indicating disk 23 is made partly cylindrical and partly conical, so that its conical part runs into that of the rim 10. A mark 25 provided on the conical part of the disk 23 serves as an indicator for the scale 11. The conical rim of the disk 23 is in one place cut out, so that a plate 26 can engage in the cut formed. The plate 26 is fastened on the disk 23 by several screws 27, 27 and extends to without, so that a plate 28 can be attached to its underside by means of screws 29, 29. In Fig. 5 the plate 28 has at its left end a cylindrical hole 30 and at its right end a slot 31 (see Fig. 8). A bearing 32 is connected with the plate 28 by a bolt 33 passing through the hole 30 and by a nut 34, so that this bearing is permitted to rock. Another bearing 35 is connected with the plate 28 by a bolt 36 and a nut 38, which latter bears on a washer 37. As the bolt 36 passes through the slot 31 and is not tightened by the nut 38, it will be understood, that the bearing 35 can be a little shifted and rocked on the plate 28. A tube 39 is fastened in the bearing 35 by means of a screw 40. A shaft 41 made in one with a worm 42 and a collar 43 is mounted to turn in the two bearings 32 and 35 and is prevented from endwise motion by a disk 44 and a screw 45. A set-off knurled knob 46 is fastened at the right end of the shaft 41 in Figs. 5 and 6 and is provided on the outside of its reduced part with a scale 47. A small handle 48 made in one with a cam 49 (Fig. 4) is mounted to turn on the tube 39 and is prevented from endwise motion by a tube 50 inserted between it and the knob 46. An indicator 51 for the scale 47 is fastened on the tube 50 by a screw passing through it and the tube 39. A pin 52 is fastened at the right end and a leaf spring 53 at the left end of the plate 28 in Fig. 6. The leaf spring 53 presses on the bearing 35 and thereby the handle 48 is forced against the pin 52. When the handle 48 occupies its normal position shown at Fig. 4, the worm 42 is to engage in the teeth 9 of the base disk 1. However, when the handle 48 is turned upward with the finger in a horizontal position, its cam 49 will strike the pin 52, so that the shaft 41 will be thereby pushed to the front and consequently the worm 42 will be moved out of engagement with the teeth. Then the indicating disk 23 can be turned with the tubular support 16 around the pillar 13.

A tube 54 (Fig. 1) is mounted on the tubular support 16 to turn and is prevented from endwise motion by the nave of the indicating disk 23 and by a ring 55 fastened on the support 16 by a screw 56. The tube 54 has a flange 57, on which a conical drum 58 is fastened. The lower end of the drum 58 is made cylindrical, so that space for an angle-piece 59 is obtained, which is fastened on the plate 26 by screws or the like and serves for holding an inclined rule 60. This rule is parallel to the side of the drum 58 and is on its outside provided with a scale 61, which will be referred to later on. The drum 58 is on its outside provided with curves 62, 62 and a perpendicular 63, which will be likewise referred to later on. A slide 67 is mounted on the rule 60 to move and is provided with a leaf spring 68 (Fig. 11) by means of which it can be elastically adjusted. It is provided with an arm 69, on which an indicator 70 for the curves 62, 62 on the drum 58 can be shifted and secured by a thumb-screw 71. On the upper edge of the drum 58 a toothed ring 64 is mounted to turn, which can be secured and released by a screw 65 (Fig. 9) bearing against a pressing piece 66.

A nut 72 (Fig. 1) is pressed into a hole at the left end of the crosshead 17 and a vertical adjusting screw 73 engages in this nut. At the lower smooth end of the screw 73 a long pinion 74 is fastened by means of a key 75, which pinion meshes with the toothed ring 64. The screw 73 is connected with a knurled knob 76 by means of which it can be turned. It is further pivotally connected with a supporting disk 77 by means of a ball 78 and a socket 79 (Fig. 10). A telescope 80 of any known construction is employed, which is provided with two mountings 81 and 82, and a dumpy-level 83. The mounting 81 has a plane surface which bears on the supporting disk 77. Of course these two bearing surfaces will require to be ground and nicely fitted together so as to insure the exactness of the instrument. The other mounting 82 is pivotally connected with the upwardly bent right end of the crosshead 17 in Fig. 1 by means of a slightly conical bolt 84 (Fig. 13), which is ground and nicely fitted into the eyes 85, 85 of the crosshead and into the hole of the mounting 82.

The distance instrument is operated as follows: It is disposed at some known height above the level of the sea and its base disk 1 is by means of the three adjusting feet 2, 3, 4, 5, 6, 7, 8 carefully placed horizontally and in such a manner, that the zero-point of the scale 11 occupies the same position as that of the gun battery. That is to say, the horizontal radius connecting the zero-point of the scale 11 with the vertical axis of the instrument is placed parallel to the straight line connecting the zero-point of the scale at each gun with the respective center. Thereby the gun's crew is enabled to turn the gun through the same horizontal angle as that through which the telescope 80 of the instrument has been turned. The adjusting screw 65 is then unscrewed for releasing the toothed ring 64, whereupon the drum 58 is turned into such a position that the indicator 70 points at the initial line 63. Now the telescope 80 is vertically adjusted by means of the knurled knob 76 so as to bring the dumpy-level 83 into its horizontal position, when the axis of the telescope will be in a horizontal plane. Then the adjusting screw is again screwed home, after which the position of the drum 58 may be once more corrected with the aid of the dumpy-level 83 by exactly adjusting the indicator 70. For making any measurement, it is necessary to first move the slide 67 into that position on the scale 61 which corresponds to the momentary height of the level of the sea. When by means of the dumpy-level 83 the telescope has been brought into a horizontal position, as described above, it must be in a plane, which is not that of the actual horizon of the sea, but in the plane of an ideal horizon assumed to be *ad infinitum* ($\infty$). For this reason the initial line 63 marked with $\infty$ must be in the vertical radial plane of the drum 58 passing through the indicator 70 as is shown at Fig. 2, as long as the drum occupies its initial position indicated by the zero-point of the scale 11. When after the adjustment of the slide 67 on the scale 61 as described above the knurled knob 76 is turned to raise the rear end of the telescope 80 enough to bring the actual horizon of the sea into the horizontal line of the "cross hairs", the pinion 74 simultaneously turned will have turned the drum 58 so much that the indicator 70 points at the curve 62 marked with H. This line H is determined by the indicated position of the telescope and by the varying tide. That is to say, the indicator 70 must invariably point at the line H, after it has been adjusted in accordance with the momentary tide. The other curves 62 are determined in a similar manner to the line H. That is to say, the more the telescope 80 is inclined, the larger will be the angle through which the drum 58 is turned by the pinion 74, and for the same position of the telescope the indicator 70 is required to invariably point at the same curve 62, after it has been adjusted on the scale 61 in accordance with the momentary tide.

If at any moment some vessel is sighted and is not in the vertical plane of the telescope, the handle 48 is turned upward, so as to withdraw the worm 42 from the teeth 9 of the base disk 1, and the indicating disk 23 (which is rigidly connected with the telescope) is by means of the plate 28 rapidly turned until the vessel approximately appears in the vertical line of the "cross hairs", whereupon the handle 48 is again turned downward. Then the knurled knob 46 is so turned as to bring the vessel exactly into the vertical line of the "cross hairs". Now the angle which the vessel makes with the zero point can be read off the scale 11 by means of the indicator 25 and off the scale 47 by means of the indicator 51. If the floating-line of the vessel is not in the horizontal line of the "cross hairs", the rear end of the telescope 80 is by means of the knob 76 so much raised or lowered as to bring the floating-line of the vessel exactly into the horizontal line of the "cross hairs". Then the pinion 74 will have turned the drum 58 so much, that the indicator 70 will indicate some point in some curve 62 or between any two of them. Provided that the slide 68 occupies the right position on the rule 60 in accordance with the momentary tide the distance can be read off the curve 62 bearing the respective figure or off two curves 62, 62 bearing figures near that of the right distance. It is evident, that the nearer the vessel is the deeper beneath the horizon will it be and therefore the more will the rear end of the telescope have to be raised and consequently the greater is the angle through which the drum 58 requires to be turned. Thereby the position of the several curves 62, 62 on the drum 58 is determined and their inclination is determined by the length of the scale 61 in accordance with the range of the tide. Of course known mathematical formulæ will have to be used for ascertaining the curves 62 on the drum 58.

The distance instrument can be varied in many respects without departing from the spirit of my invention.

I claim:

1. In a distance instrument, the combination with a base, of a pillar secured in said base, a support mounted on said pillar to turn, means for determining the angular position of said support in relation to said base, a telescope mounted on said support to rock about a horizontal axis at right angles to its optical axis, a measuring drum mounted on said support to turn around said pillar, a gearing so connecting said telescope with said measuring drum that an inclination of the telescope causes the drum to turn, and an indicator at said support.

2. In a distance instrument, the combination with a base disk, of means for horizontally adjusting said base disk, a pillar secured in the center of said base disk, a support mounted on said pillar to turn, means for determining the angular position of said support in relation to said base disk, a telescope mounted on said support to rock about a horizontal axis at right angles to its optical axis, a measuring drum mounted on said support to turn around said pillar, a gearing so connecting said telescope with said measuring drum that an inclination of the telescope causes the drum to turn, and an indicator at said support.

3. In a distance instrument, the combination with a base, of a pillar secured in said base, a tubular support mounted on said pillar to turn, an indicating disk fastened on said tubular support, means for determining the angular position of said indicating disk in relation to said base, a crosshead fastened at the upper end of said tubular support, a telescope pivotally connected with one end of said crosshead so as to rock about a horizontal axis at right angles to its optical axis, a vertical adjusting screw in the other end of said crosshead, a supporting disk so connected with the upper end of said adjusting screw as to be at liberty to move in all directions and adapted to support said telescope, means for turning said adjusting screw, a measuring drum mounted on said tubular support to turn and having at the periphery gearing teeth, a pinion fastened at the lower end of said adjusting screw and meshing with the teeth of said measuring drum, so that an inclination of the telescope causes the drum to turn, and an indicator at said indicating disk.

4. In a distance instrument, the combination with a base disk, of means for horizontally adjusting said base disk, a pillar secured in the center of said base disk, a support mounted on said pillar to turn, means for determining the angular position of said support in relation to said base disk, a telescope mounted on said support to rock about a horizontal axis at right angles to its optical axis, a measuring drum mounted on said support to turn around said pillar, a gearing so connecting said telescope with said measuring drum that an inclination of the telescope causes the drum to turn, and an indicator at said support.

5. In a distance instrument, the combination with a base disk, of means for horizontally adjusting said base disk, a pillar secured in the center of said base disk, a support mounted on said pillar to turn, means for determining the angular position of said support in relation to said base disk, a telescope mounted on said support to rock about a horizontal axis at right angles to its optical axis, a measuring drum mounted on said support to turn around said pillar, a gearing so connecting said telescope with said measuring drum that an inclination of the telescope causes the drum to turn, and an indicator at said support.

6. In a distance instrument, the combination with a base disk, of means for horizontally adjusting said base disk, a pillar secured in the center of said base disk, a tubular support mounted on said pillar to turn, an indicating disk fastened on said tubular support, means for determining the angular position of said indicating disk in relation to said base disk, a crosshead fastened at the upper end of said tubular support, a telescope pivotally connected with one end of said crosshead so as to rock about a horizontal axis at right angles to its optical axis, a vertical adjusting screw in the other end of said crosshead, a supporting disk so connected with the upper end of said adjusting screw as to be at liberty to move in all directions and adapted to support said telescope, means for turning said adjusting screw, a measuring drum mounted on said tubular support to turn and having at the periphery gearing teeth, a pinion fastened at the lower end of said adjusting screw and meshing with the teeth of said measuring drum, so that an inclination of the telescope causes the drum to turn, and an indicator at said indicating disk.

7. In a distance instrument, the combination with a base disk, of means for horizontally adjusting said base disk, a pillar secured in the center of said base disk, a tubular support mounted on said pillar to turn, an indicating disk fastened on said tubular support, means for determining the angular position of said indicating disk in relation to said base disk, a crosshead fastened at the upper end of said tubular support, a telescope pivotally connected with one end of said crosshead so as to rock about a horizontal axis at right angles to its optical axis, a vertical adjusting screw in the other end of said crosshead, a supporting disk so connected with the upper end of said adjusting screw as to be at liberty to move in all directions and adapted to support said telescope, means for turning said adjusting screw, a measuring drum mounted on said tubular support to turn, a toothed ring adjustable at the periphery of said measuring drum, a pinion fastened at the lower end of said adjusting screw and meshing with said toothed ring, so that an inclination of the telescope causes the drum to turn, and an indicator at said indicating disk.

8. In a distance instrument, the combination with a base, of a pillar secured in said base, a support mounted on said pillar to turn, means for determining the angular position of said support in relation to said base, a telescope mounted on said support to rock about a horizontal axis at right angles to its optical axis, a measuring drum mounted on said support to turn around said pillar, a gearing so connecting said telescope with said measuring drum that an inclination of the telescope causes the drum to turn, a rule secured on said support and provided with a scale corresponding to the range of the tide, and an indicator adjustable on said rule, said measuring drum having on its mantle curves corresponding to the range of the tide as ordinate and to the distances as abscissas.

9. In a distance instrument, the combination with a base disk, of means for horizontally adjusting said base disk, a pillar secured in the center of said base disk, a support mounted on said pillar to turn, means for determining the angular position of said support in relation to said base disk, a telescope mounted on said support to rock about a horizontal axis at right angles to its optical axis, a measuring drum mounted on said support to turn around said pillar, a gearing so connecting said telescope with said measuring drum that an inclination of the telescope causes the drum to turn, a rule secured on said support and provided with a scale corresponding to the range of the tide, and an indicator adjustable on said rule, said measuring drum having on its mantle curves corresponding to the range of the tide as ordinate and to the distances as abscissas.

10. In a distance instrument, the combination with a base, of a pillar secured in said base, a tubular support mounted on said pillar to turn, an indicating disk fastened on said tubular support, means for determining the angular position of said indicating disk in relation to said base, a crosshead fastened at the upper end of said tubular support, a telescope pivotally connected with one end of said crosshead so as to rock about a horizontal axis at right angles to its optical axis, a vertical adjusting screw in the other end of said crosshead, a supporting disk so connected with the upper end of said adjusting screw as to be at liberty to move in all directions and adapted to support said telescope, means for turning said adjusting screw, a measuring drum mounted on said tubular support to turn and having at the periphery gearing teeth, a pinion fastened at the lower end of said adjusting screw and meshing with the teeth of said measuring drum, so that an inclination of the telescope causes the drum to turn, a rule secured on said indicating disk and provided with a scale corresponding to the range of the tide, and an indicator adjustable on said rule, said measuring drum having on its mantle curves corresponding to the range of the tide as ordinate and to the distances as abscissas.

11. In a distance instrument, the combination with a base disk, of means for horizontally adjusting said base disk, a pillar secured in the center of said base disk, a support mounted on said pillar to turn, means for determining the angular position of said support in relation to said base disk, a telescope mounted on said support to rock about a horizontal axis at right angles to its optical axis, a measuring drum mounted on said support to turn around said pillar, a gearing so connecting said telescope with said measuring drum that an inclination of the telescope causes the drum to turn, a rule secured on said support and provided with a scale corresponding to the range of the tide, and an indicator adjustable on said rule, said measuring drum having on its mantle curves corresponding to the range of the tide as ordinate and to the distances as abscissas.

12. In a distance instrument, the combination with a base disk, of means for horizontally adjusting said base disk, a pillar secured in the center of said base disk, a support mounted on said pillar to turn, means for determining the angular position of said support in relation to said base disk, a telescope mounted on said support to rock about a horizontal axis at right angles to its optical axis, a measuring drum mounted on said support to turn around said pillar, a gearing so connecting said telescope with said measuring drum that an inclination of the telescope causes the drum to turn, a rule secured on said support and provided with a scale corresponding to the range of the tide, and an indicator adjustable on said rule, said measuring drum having on its mantle curves corresponding to the range of the tide as ordinate and to the distances as abscissas.

13. In a distance instrument, the combination with a base disk, of means for horizontally adjusting said base disk, a pillar secured in the center of said base disk, a tubular support mounted on said pillar to turn, an indicating disk fastened at the lower end of said tubular support, means for determining the angular position of said indicating disk in relation to said base disk, a crosshead fastened at the upper end of said tubular support, a telescope pivotally connected with one end of said crosshead so as to rock about a horizontal axis at right angles to its optical axis, a vertical adjusting screw in the other end of said crosshead, a supporting disk so connected with the upper end of said adjusting screw as to be at liberty to move in all directions and adapted to support said telescope, means for turning said adjusting screw, a measuring drum mounted on said tubular support to turn and having at the periphery gearing teeth, a pinion fastened at the lower end of said adjusting screw and meshing with the teeth of said measuring drum, so that an inclination of the telescope causes the drum to turn, a rule secured on said indicating disk and provided with a scale corresponding to the range of the tide, and an indicator adjustable on said rule, said measuring drum having on its mantle curves corresponding to the range of the tide as ordinate and to the distances as abscissas.

14. In a distance instrument, the combination with a base disk, of means for horizontally adjusting said base disk, a pillar secured in the center of said base disk, a tubular support mounted on said pillar to turn, an indicating disk fastened at the lower end of said tubular support, means for determining the angular position of said indicating disk in relation to said base disk, a crosshead fastened at the upper end of said tubular support, a telescope pivotally connected with one end of said crosshead so as to rock about a horizontal axis at right angles to its optical axis, a vertical adjusting screw in the other end of said crosshead, a supporting disk so connected with the upper end of said adjusting screw as to be at liberty to move in all directions and adapted to support said telescope, means for turning said adjusting screw, a measuring drum mounted on said tubular support to turn, a toothed ring adjustable at the periphery of said measuring drum, a pinion fastened at the lower end of said adjusting screw and meshing with said toothed ring, so that an inclination of the telescope causes the drum to turn, a rule secured on said indicating disk and provided with a scale corresponding to the range of the tide, a slide adjustable on said rule and having an arm, and an indicator adjustable on the arm of said slide, said measuring drum having on its mantle curves corresponding to the range of the tide as ordinate and to the distances as abscissas.

CARL MÖLLER.

Witnesses:
HERMANN JOACHIM,
ERNST KRESSE.